United States Patent [19]

Ina et al.

[11] Patent Number: 4,513,721
[45] Date of Patent: Apr. 30, 1985

[54] AIR-FUEL RATIO CONTROL DEVICE FOR INTERNAL COMBUSTION ENGINES

[75] Inventors: Toshikazu Ina, Aichi; Hideki Obayashi, Okazaki; Hisasi Kawai, Toyohashi; Tokio Kohama, Nishio; Daisaku Sawada; Takashi Shigematsu, both of Susono, all of Japan

[73] Assignees: Nippon Soken, Inc., Nishio; Toyota Jidosha Kabushiki Kaisha, Toyota, both of Japan

[21] Appl. No.: 406,527

[22] Filed: Aug. 9, 1982

[30] Foreign Application Priority Data

Aug. 11, 1981 [JP]  Japan .................................. 56-124661
Aug. 31, 1981 [JP]  Japan .................................. 56-135581

[51] Int. Cl.³ ............................ F02B 5/00; F02B 3/04; F02B 3/02; F02D 5/00
[52] U.S. Cl. ................................. 123/478; 123/425; 123/419; 123/436
[58] Field of Search ............... 123/436, 425, 419, 478; 73/35

[56] References Cited

U.S. PATENT DOCUMENTS

| 2,252,416 | 8/1941 | Schwarz | 123/436 |
| 4,064,846 | 12/1977 | Latsch et al. | 123/436 |
| 4,188,920 | 2/1980 | Bianchi et al. | 123/436 |
| 4,316,440 | 2/1982 | Lamaguchi et al. | 123/425 |
| 4,347,820 | 9/1982 | Déléris | 123/425 |
| 4,356,551 | 10/1982 | Iwase et al. | 123/425 |
| 4,357,662 | 11/1982 | Schira et al. | 123/419 |
| 4,372,269 | 2/1983 | Coles | 123/436 |

Primary Examiner—Raymond A. Nelli
Attorney, Agent, or Firm—Cushman, Darby & Cushman

[57] ABSTRACT

In an air-fuel ratio control device, a torque detector for detecting torque variations which indicate combustion variations in an engine is mounted at the supporting portions of the internal combustion engine. A detecting signal from the torque detector is introduced into an electronic control unit which controls the amount of injecting fuel, namely the air-fuel ratio. The electronic control unit controls the air-fuel ratio toward the lean side by the signal from the torque detector so that the combustion variations (torque variations) in the engine does not become large.

7 Claims, 21 Drawing Figures

|  | $NE_1$ | $NE_2$ | - - - - - | $NE_n$ | - - - - - | $NE_N$ |
|---|---|---|---|---|---|---|
| $Q/N_1$ | $TA_{1,1}$ | $TA_{2,1}$ | - - - - - | $TA_{n,1}$ | - - - - - | $TA_{N,1}$ |
| $Q/N_2$ | $TA_{1,2}$ | $TA_{2,2}$ | - - - - - | $TA_{n,2}$ | - - - - - | $TA_{N,2}$ |
| ⋮ | ⋮ | ⋮ |  | ⋮ |  | ⋮ |
| $Q/N_m$ | $TA_{1,m}$ | $TA_{2,m}$ | - - - - - | $TA_{n,m}$ | - - - - - | $TA_{N,m}$ |
| ⋮ | ⋮ | ⋮ |  | ⋮ |  | ⋮ |
| $Q/N_M$ | $TA_{1,M}$ | $TA_{2,M}$ | - - - - - | $TA_{n,M}$ | - - - - - | $TA_{N,M}$ |

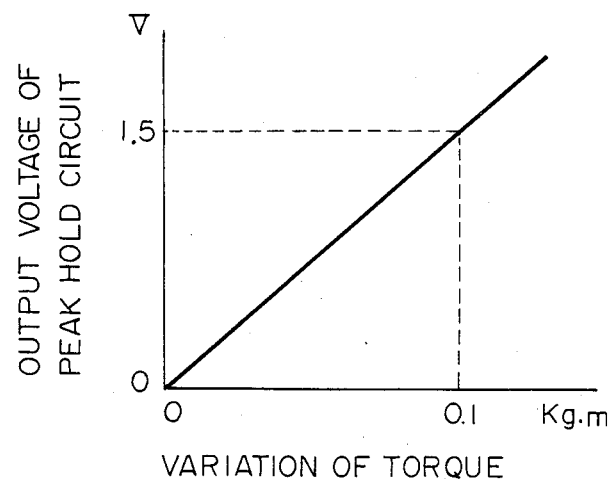

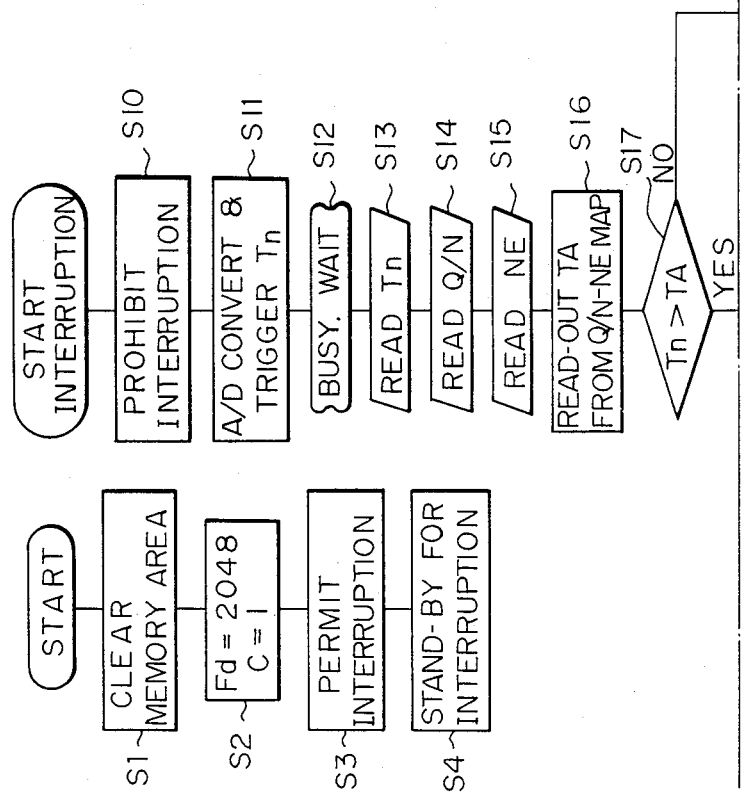

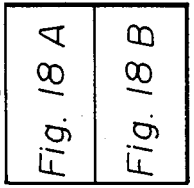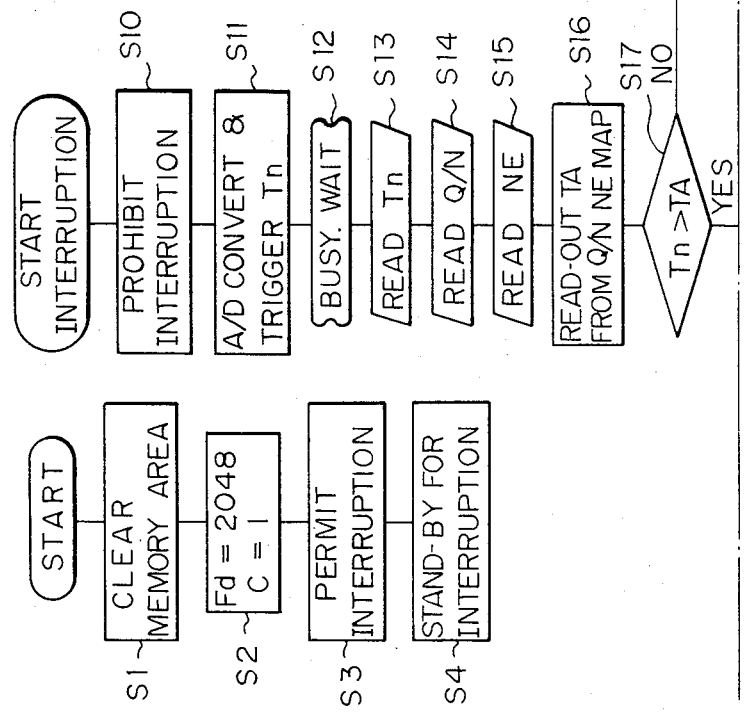
Fig. 18A

AIR-FUEL RATIO CONTROL DEVICE FOR INTERNAL COMBUSTION ENGINES

BACKGROUND OF THE INVENTION

1. Field of the Invention

The present invention relates to an air-fuel ratio control device for internal combustion engines.

2. Description of the Prior Art

The components of the gas burned and exhaust from an internal combustion engine and the engine torque are closely related to the air-fuel ratio (A/F) of the carburetor supplying the air-fuel mixture to the engine, as shown in FIG. 1. Therefore, while automobile exhaust can theoretically be cleaned by a variety of methods, there are only three main practical methods from the standpoint of the A/F ratio. These are:

(1) Setting the air-fuel ratio to the rich mixture region where the emission of nitrogen oxides (NOx) is small, as shown by A in FIG. 1, installing a cleaner such as catalyst in the exhaust pipe, and supplying additional air by a secondary air feeding device, in order to remove unburnt carbon monoxide (CO) and hydrocarbons (HC), (2) Operating the engine in the lean mixture region where the emission of NOx, CO, and HC is small, as indicated by B in FIG. 1, and (3) Installing a three-way catalyst in the exhaust pipe, setting the A/F ratio near the stoichiometric A/F ratio, as indicated by C in FIG. 1, and removing the CO, HC, and NOx simultaneously by the three-way catalyst.

Recently, automotive designers have been required not only to produce engines with cleaner exhaust but also, from the viewpoint of resource conservation, to produce engines with lower fuel consumption rates. To simultaneously clean the exhaust and reduce the fuel consumption rate, it is advantageous to operate the engine in the lean mixture region. In the lean mixture region, however, misfires easily occur. Individual manufacturing differences and aging of the engine and related parts (carburetors and the like) make it almost impossible for engines to be operated in the lean mixture region near where misfires would take place. In practice engines are operated in a rich, stable region, i.e., a region where the A/F ratio is about twice as dense as the misfire-prone region. This is a problem, therefore, in purifying the exhaust and saving resources.

As shown in FIG. 1, the minimum fuel consumption rate is achieved when the engine is operated at a lean A/F ratio just above the misfire region. The variation in combustion (variation of torque in this embodiment, as will be mentioned later) is related to the A/F ratio and increases rapidly on approaching the misfire region.

SUMMARY OF THE INVENTION

In view of the above-mentioned problems, the principal object of the present invention is to achieve both clean exhaust and an improved fuel consumption rate by detecting variations in engine combustion, and controlling the engine A/F ratio to maintain the engine combustion variation below a predetermined value.

According to a fundamental idea of the present invention, there is provided an air-fuel ratio control device for internal combustion engines equipped with a control means which controls the A/F ratio in response to engine operating conditions. The device provides a detector, which detects variation in combustion in the engine, and a control circuit, into which is introduced the output from the combustion variation detector. It is constructed to detect variation in combustion by the output from the combustion variation detector and to correct the A/F ratio in response to the variation in combustion.

BRIEF DESCRIPTION OF THE DRAWINGS

In the drawings,

FIG. 16 is a diagram illustrating the relation between the engine torque variation and the output voltage of the peak hold circuit in the flow chart of FIG. 13;

FIGS. 17A and 17B and 18A and 18B are flow charts illustrating other embodiments of calculation using the control circuit of FIG. 3; and FIG. 19 is a diagram illustrating the number of times for dividing the correction stored in the memory.

DESCRIPTION OF THE PREFERRED EMBODIMENTS

Figure 2:
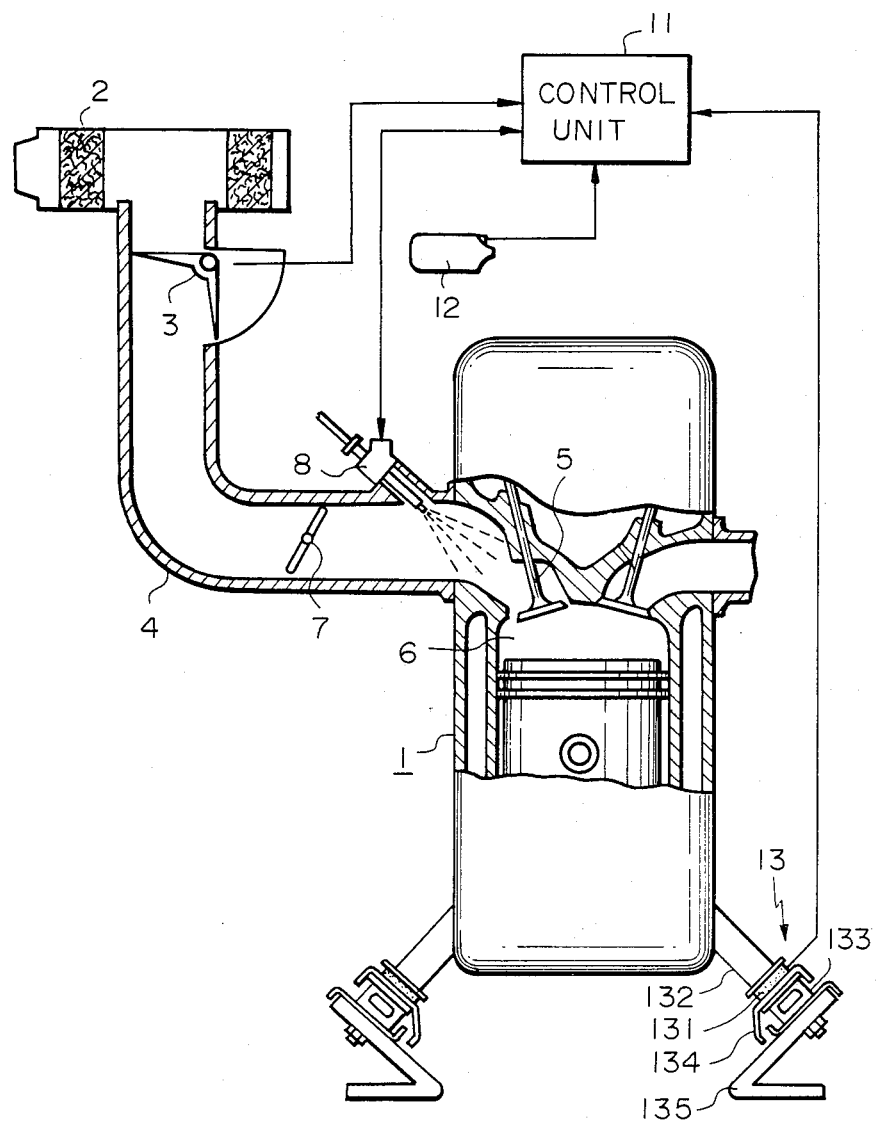
FIG. 2 is a diagram illustrating the construction of an A/F ratio control device for an internal combustion engine according to an embodiment of the present invention.

An A/F ratio control device for internal combustion engines according to an embodiment of the present invention will be described below in conjunction with FIGS. 2 to 16. In FIG. 2, an internal combustion engine 1 is a spark ignition type for driving an automobile. Air for combustion is introduced into a combustion chamber 6 of the engine 1 through an air cleaner 2, an airflow meter 3, an intake pipe 4, and an intake valve 5. The intake pipe 4 is provided with a throttle valve 7 operated by the driver. The fuel is injected toward the intake valve 5 from an electromagnetic fuel injector 8 installed in the intake pipe 4. An electronic control unit 11 controls the amount of fuel depending upon the engine operating conditions and drives the fuel injector 8 to control the amount of fuel. The control unit 11 receives detection signals from the air-flow meter 3 which detects the amount of the intake air, signals from an ignition coil 12, and signals from a torque detector 13, which detects torque variation. In this embodiment, signals of the air-flow meter 3 are used to represent the amount of the air taken in by the engine 1. It is, however, also allowable to find the amount of the intake air from the intake vacuum in the downstream side of the throttle valve 7 and from the engine speed. The engine speed may, of course, be found by detecting the speed signals from a ring gear or an ignition distributor that rotates in synchronization with the engine 1. The torque detector 13 is bolted to a mount 135 which supports the engine 1. Engine vibration around the crankshaft in the lean band is detected by piezoelectric elements placed facing a plurality of directions (preferably, four or more) to obtain analog signals proportional to the mechanical torque variation of the engine. Although the diagrammed embodiment has two piezoelectric elements, a single piezoelectric element will suffice for obtaining the analog signals of vibration. The torque detector 13 consists of a pressure sensor 131, a rubber mount 133, and a rubber mount cover 134. The pressure sensor 131, the rubber mount cover 134, and the rubber mount 133 are stacked and mounted in the order mentioned from the side of the arm 132. The pressure sensor 131 may be a commercially available sensor using a piezoelectric element.

Figure 3:
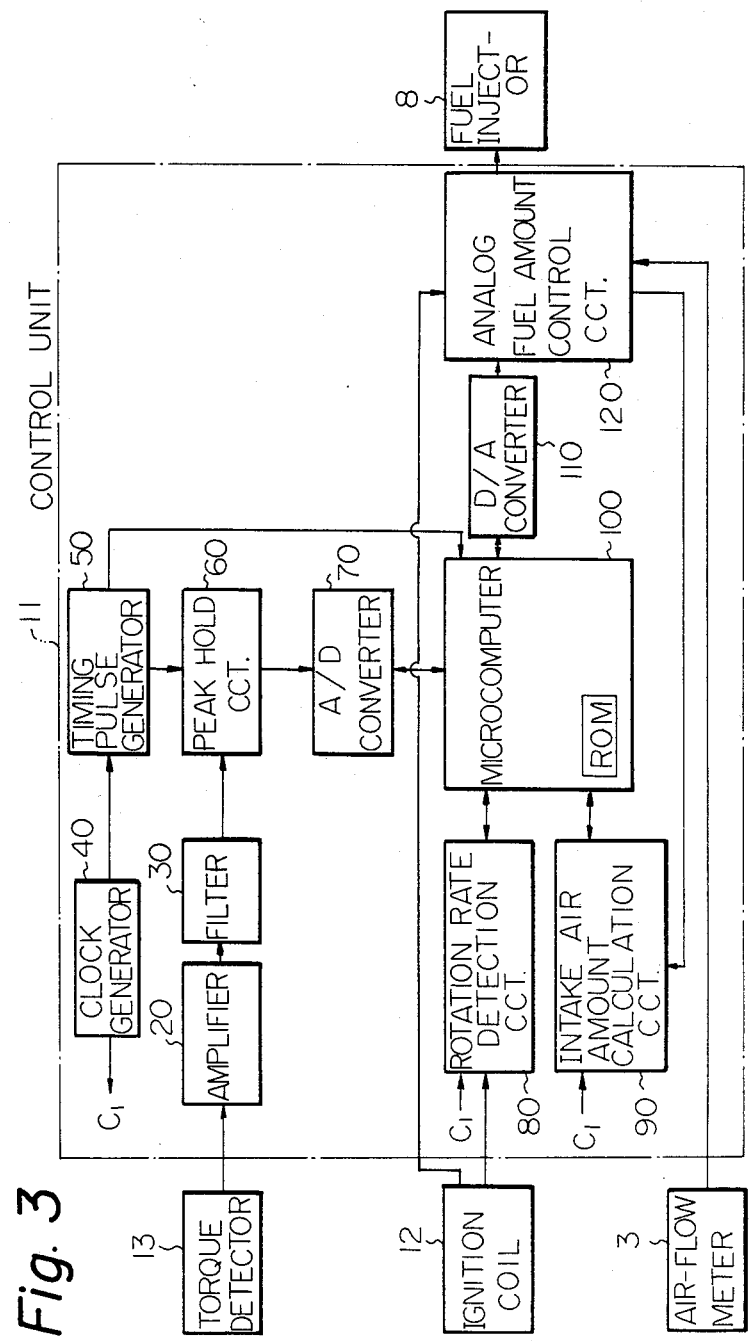
FIG. 3 is a block diagram of a control circuit in the device of FIG. 2.

The control unit 11 will be described below in conjunction with FIG. 3. An amplifier 20 is a known amplifier consisting of a buffer and an amplifier. A band-pass filter 30 works to take out outputs of frequencies of 1 Hz to several Hz among the analog signals produced by the amplifier 20. The band-pass filter 30 may, for example, be a Model 852 manufactured by Rockland Systems. A clock circuit 40 consists of an oscillation circuit which makes use of a quartz vibrator and a counter which divides the frequency of the oscillation circuit. Since the clock circuit 40 is constructed in a conventional manner, its details are not described here.

Figure 4:
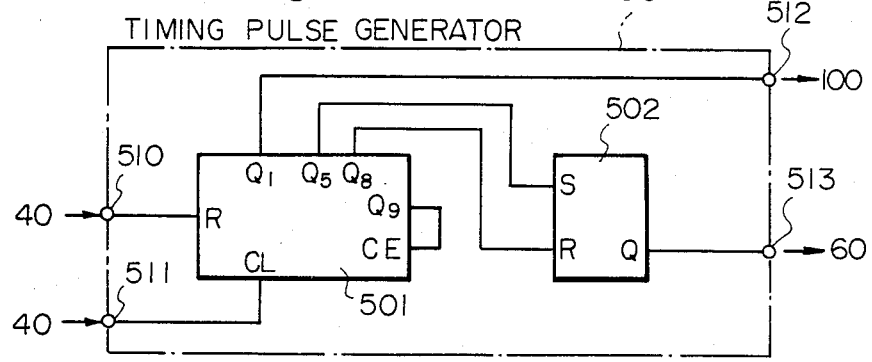
FIG. 4 is a diagram of a timing pulse generator circuit in the control circuit of FIG. 3.

A timing pulse generator circuit 50 produces a reset signal that is input to a peak hold circuit 60 and an interruption signal that is input to a microcomputer 100 in response to clock signals from the clock circuit 40. In FIG. 4 is illustrated a circuit setup of the timing pulse generator 50, in which 2 Hz and 5 kHz clock signals produced by the clock circuit 40 are input to input terminals 510, 511, respectively. The input terminal 510 is connected to a reset terminal R of a divider-equipped counter 501. The input terminal 511 is connected to a clock terminal CL of the divider-equipped counter 501. The divider-equipped counter 501 may, for example, be an integrated circuit, CD 4017, manufactured by RCA. Its output Q1 produced through a terminal 512 is used as an interruption signal for calculation by a correction calculation circuit (microcomputer) 100. Outputs Q5 and Q8 are connected to a set terminal S and to a reset terminal R of an R-S flip-flop 502. An output Q9 is connected to a clock enable terminal CE. The R-S flip-flop 502 may, for example, be CD 4013, produced by RCA. An output Q of the R-S flip-flop 502 is connected to the peak hold circuit 60 via a terminal 513.

Figure 6:
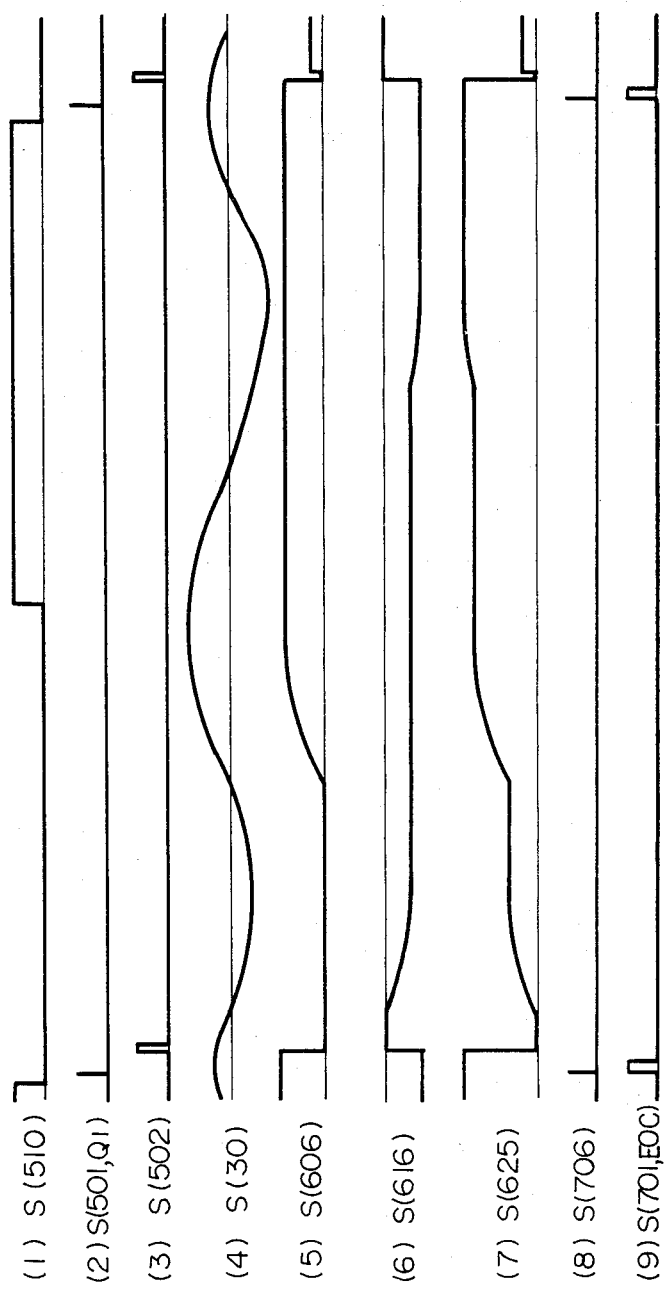
FIG. 6 is a diagram of waveforms for illustrating the operation of the control circuit of FIG. 3.

The operation of the thus constructed timing pulse generator circuit 50 will be described below. The divider-equipped counter 501 receives through the reset terminal a 2 Hz pulse of (1) in FIG. 6 and starts the counting operation when the level of the pulse is shifted from "1" to "0". The clock input of the counter 501 receives clock pulses of 5 kHz frequency. Therefore, a pulse output is produced at the output Q1 upon receipt of the first pulse. Upon receipt of the ninth pulse, the output Q9 assumes the level "1" so that the level becomes "1" at the clock enable terminal. Therefore, the counter 501 inhibits the introduction of clock signals until the reset terminal is next reset. Accordingly, the output Q1 produces pulses as shown (2) in FIG. 6. The output pulses pass through the terminal 512 and serve as trigger pulses for initiating calculation by interruption by the microcomputer 100. Outputs Q5 and Q8 set and reset the R-S flip-flop 502, and pulses shown (3) in FIG. 6 are produced from the output Q of the R-S flip-flop 502. The pulses pass through the terminal 513 and are input to the peak hold circuit 60. In other words, the pulses have a width of about 600 microseconds and serve as reset signals for the peak hold circuit.

Figure 5:
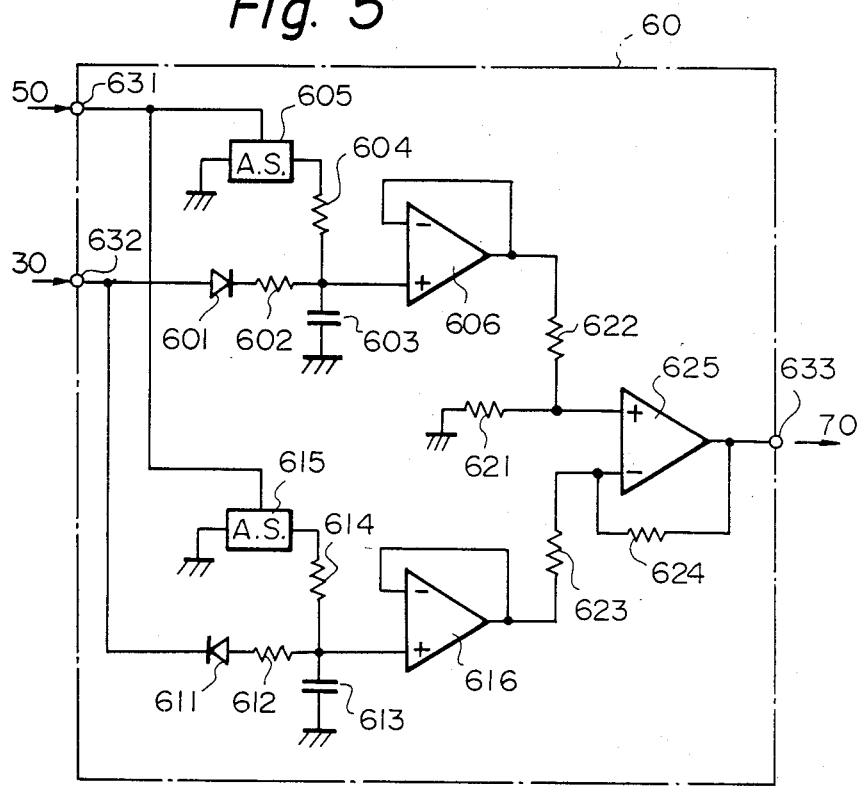
FIG. 5 is a diagram of a peak hold circuit in the control circuit of FIG. 3.

In FIG. 5, the anode of a diode 601 and the cathode of a diode 611 are connected to the output of the band-pass filter 30. The cathode of the diode 601 is connected to one end of a resistor 602, the other end of which is connected to a positive electrode of a capacitor 603, to a non-inversion input of a buffer amplifier 606, and to a resistor 604. The negative electrode of the capacitor 603 is grounded. The other end of the resistor 604 is connected to one end of an analog switch 605. The other end of the analog switch 605 is grounded. Its control terminal receives signals of (3) in FIG. 6 produced by the timing pulse generator circuit 50. The inverted input of the buffer amplifier 606 is connected to its output. The anode of the diode 611 is connected to one end of a resistor 612 of which the other end is connected to the negative electrode of a capacitor 613, to a non-inversion input of a buffer amplifier 616, and to a resistor 614. The positive electrode of the capacitor 613 is grounded. The other end of the resistor 614 is connected to one end of an analog switch 615. The other end of the analog switch 615 is grounded, and a control terminal thereof receives signals of (3) in FIG. 6 produced by the timing pulse generator circuit 50. The inverted input of the buffer amplifier 616 is connected to the output thereof. The output of the buffer amplifier 606 is connected to one end of a resistor 622, the other end of which is connected to a non-inversion input of a buffer amplifier 625 and to a resistor 621, the other end of which is grounded. The output of the buffer amplifier 616 is connected to one end of a resistor 623, the other end of which is connected to an inverted input of the buffer amplifier 625. The output of the buffer amplifier 625 is input via an output terminal 633 to an A-D converter 70 and is also applied to one end of a resistor 624, the other end of which is connected to the inverted input of the buffer amplifier 625.

The operation of the thus constructed peak hold circuit 60 will be described below. Analog switches 605, 615 are closed upon receipt, through control inputs, of a pulse of (3) in FIG. 6 produced by the timing pulse generator circuit 50 for a period of time corresponding to the pulse width. Therefore, the electric charges in the capacitors 603, 613 are discharged through resistors 604, 614 having small resistances, so that voltages of the capacitors 603, 613 are reset to zero. Then, when an output having a waveform shown (4) in FIG. 6 produced by the band-pass filter 30 is supplied through the input terminal 632, capacitor 603 is positively charged via the diode 601 and the resistor 602. A positive peak value of voltage is held in the capacitor 603 from the time when it is reset until the time when it is next reset. In (5) in FIG. 6 is shown a waveform when the voltage of the capacitor 603 is produced via the buffer amplifier 606 having a high input impedance. When the output having the waveform shown (4) in FIG. 6 is introduced through the input terminal 632, on the other hand, the capacitor 613 is negatively charged via the diode 611 and the resistor 612. A negative peak value of voltage is held in the capacitor 613 from the time it is reset until the time when it is next reset. In (6) in FIG. 6 is shown a waveform when the voltage of the capacitor 613 is produced via the buffer amplifier 616 having a high input impedance. The difference between the output of the buffer amplifier 606 and the output of the buffer amplifier 616 is found through a differential amplifier 625. That is, the differential amplifier 625 produces the difference between a positive peak value and a negative peak value from the time the capacitors are reset until the time they are next reset, as shown (7) in FIG. 6.

Figure 7:
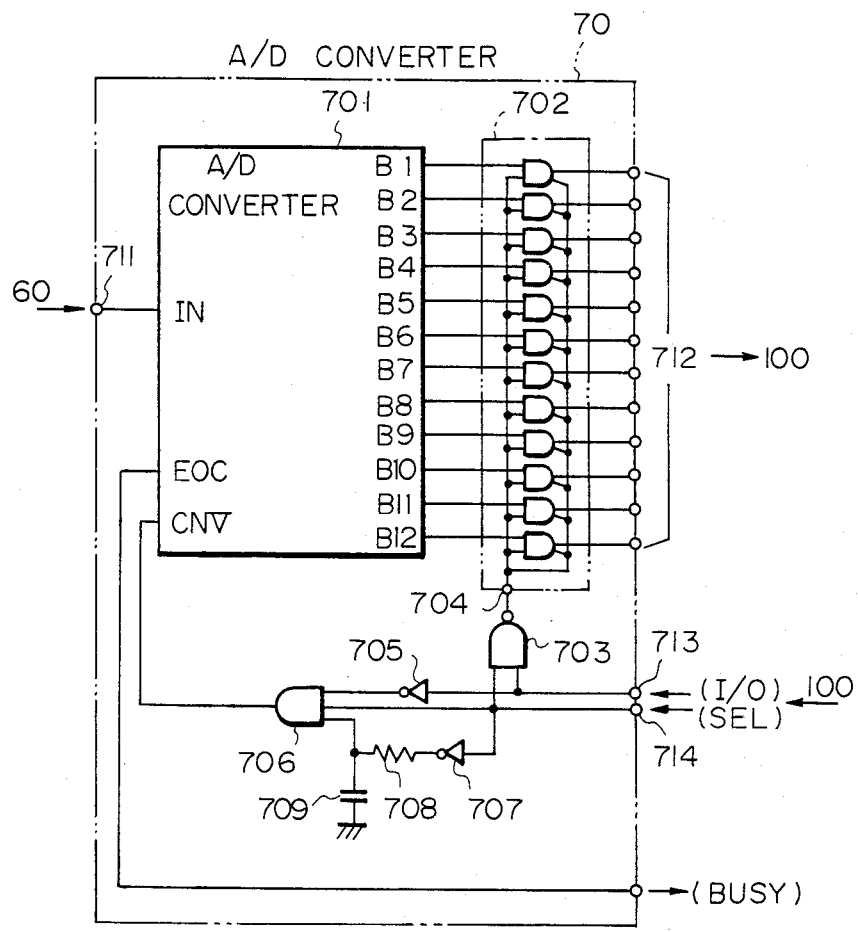
FIG. 7 is a diagram of an analog-digital converter circuit in the control circuit of FIG. 3.

In FIG. 7 an input/output control (I/O) signal produced by the microcomputer 100 is directly input to a NAND gate 703 and is input to an inverter 705 after being inverted through an AND gate 706. A device select (SEL) signal of the microcomputer 100 is directly input to the NAND gate 703 and to the AND gate 706. A delay circuit is made up of an inverter 707, a resistor 708, and a capacitor 709. The SEL signal is input to the AND gate 706 via the delay circuit. The AND gate 706 produces pulse signals of a width of about 100 nanoseconds as shown (8) in FIG. 6. The pulse signals are supplied to an A-D conversion instruction terminal CNV of an A-D sequential comparison type converter 701. The A-D converter 701 may, for example, be ADC 80 AG-12 manufactured by Burrbrown. A conversion finish terminal EOC of the A-D converter 701 is connected to a busy terminal BUSY of the microcomputer 100. The output terminals B1 to B12 are connected to bus lines of the microcomputer 100 via a three-state buffer 702. The three-state buffer 702 may, for instance, be the TC 5012 manufactured by Toshiba.

The operation of the A-D converter circuit 70 will be described below. When the pulse shown (2) in FIG. 6 is input to the microcomputer 100 from the timing pulse generator circuit 50, the program now being executed by the microcomputer 100 is interrupted and a program of A-D conversion is executed. In response to an A-D conversion start instruction, a pulse shown (8) in FIG. 6 is applied to the A-D conversion instruction terminal CNV of the A-D converter 701. The conversion operation is initiated by the rise of the pulse. At the same time, the output signal of the conversion finish terminal EOC shown (9) in FIG. 6 assumes the level "1". Here, the conversion finish terminal EOC has been connected to a busy terminal BUSY of a device control unit DCU in the microcomputer 100. The instruction for reading analog signals of the peak hold circuit 60 is not finished until the output signal at the conversion finish terminal EOC assumes the level "0". Up to this moment, the I/O signal and the SEL signal are maintained at the level "1". The sequential comparison type A-D converter 701 performs the conversion operation while the output signal at the EOC terminal is assuming the level "1". Digital binary data signals are produced from the output terminals B1 to B12. When the A-D conversion operation is finished, the output signal at the conversion finish terminal EOC assumes the level "0", whereby the stand-by state for the reading instruction of the microcomputer 100 is released, and the analog signal data from the peak hold circuit 60 is read by the microcomputer 100.

Figure 8:
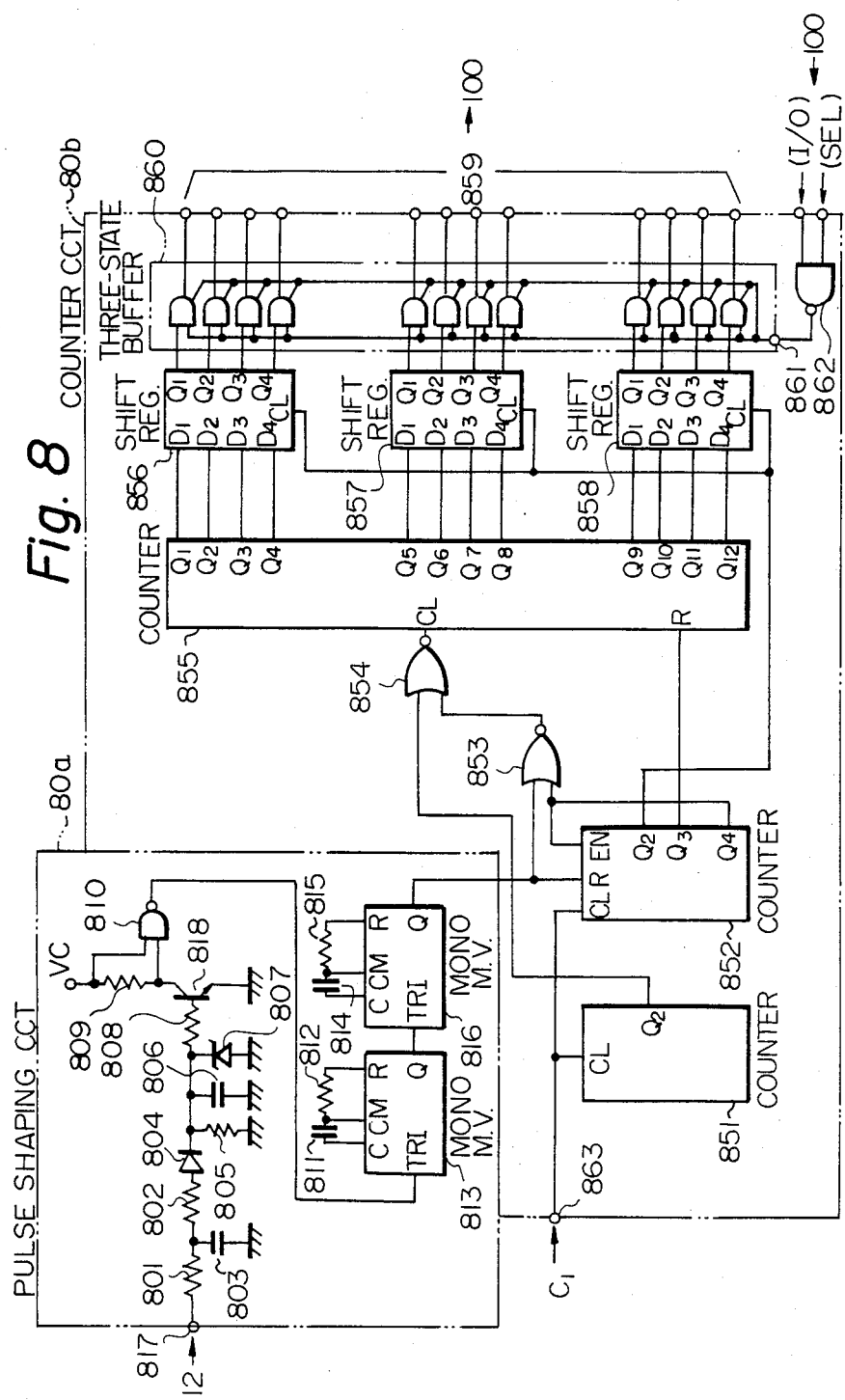
FIG. 8 is a diagram of a speed detection circuit in the control circuit of FIG. 3.

In FIG. 8 is shown a circuit diagram of a rotation rate detection circuit 80 which consists of a pulse shaping circuit 80a and a counter circuit 80b. The pulse shaping circuit 80a receives through its input terminal 817 pulses sent from the ignition coil 12, the input terminal 817 being connected to one end of a resistor 801, the other end of which is connected to a resistor 802 and to a capacitor 803. The other end of the capacitor 803 is grounded. The other end of the resistor 802 is connected to the anode of a diode 804 of which the cathode is connected to a resistor 805, a capacitor 806, a Zener diode 807, and a resistor 808. The other ends of the resistor 805, capacitor 806, and Zener diode 807 are grounded. The other end of the resistor 808 is connected to the base of a transistor 818. The emitter of transistor 818 is grounded, and the collector is connected to a resistor 809 and to a Schmidt NAND gate 810. Power-supply voltage Vc of +5 volts is applied to one end of the resistor 809 and to another input of the Schmidt NAND gate 810. The output of the Schmidt NAND gate 810 is input in the form of a trigger pulse to a monostable multivibrator 813, which consists of a capacitor 811 and a resistor 812. The output of the monostable multivibrator 813 is input in the form of a trigger pulse to a monostable multivibrator 816 which consists of a capacitor 814 and a resistor 815. The monostable multivibrators 813, 816 may, for instance, be CD 4047 manufactured by RCA. Thus, the monostable multivibrator 816 produces a timing pulse signal having a waveform as shown (2) in FIG. 9 compared with the signal from the ignition coil 12 having a waveform as shown (1) in FIG. 9.

The counter circuit 80b will be described below with reference to FIG. 8. A binary counter 851 counts and divides the clock pulse signals C1 that are input to the clock terminal CL, and may, for instance, be CD 4024 manufactured by RCA. The counter 851 divides the frequency of the clock pulse signals C1 having an approximately 128 kHz frequency as shown (3) in FIG. 9 and produces through the output terminal Q2 pulse signals having an approximately 32 kHz frequency as shown (4) in FIG. 9. A divider-equipped counter 852 counts the clock pulse signals C1 that are input to the clock terminal CL and stops the counting operation when the output signal assumes the level "1" at any one of the output terminals Q2 and Q4 and when a signal having the level "1" is input to counting operation stop terminal EN.

In this embodiment, the output terminal Q4 has been connected to the stop terminal EN. When the output at the output terminal Q4 assumes the level "1", a signal of the level "1" is input to the stop terminal EN and the counting operation is stopped. Under this condition, when the timing pulse signal shown (2) in FIG. 9 is input to a reset terminal R from the pulse-shaping circuit 80a, the counter 852 is reset, and the output at the output terminal Q4 assumes the level "0" as shown (7) in FIG. 9. Then, as a time T lapses and a signal input to the reset terminal R assumes the level "0", the counter 852 initiates the counting operation, and pulse signals shown (5) and (6) in FIG. 9 are produced successively from the output terminals Q2, Q3. Thereafter, when the output at output terminal Q4 assumes the level "1", the counter 852 stops the counting operation. Output signals of the counters 851, 852 and the pulse-shaping circuit 80a are input to the clock terminal CL of a 12-bit counter 855 via NOR gates 853, 854, respectively, and the output from the terminal Q3 of the counter 852 is input to the reset terminal R of the counter 855.

Figure 9:
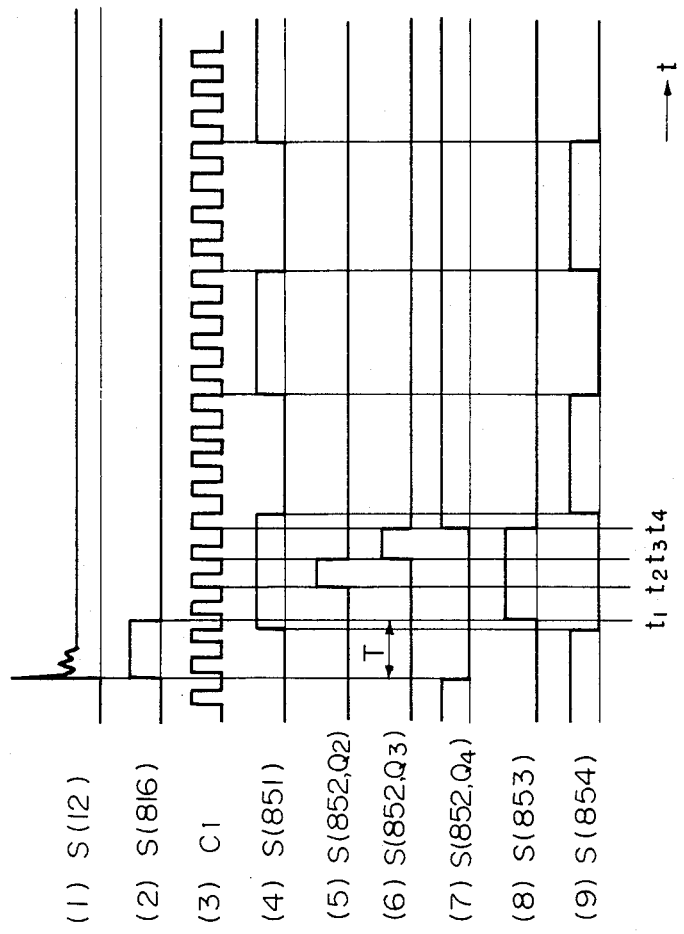
FIG. 9 is a diagram of waveforms for illustrating the operation of the speed detection circuit of FIG. 8.

That is, relying upon the NOR logic of the output signal of the pulse-shaping circuit 80a shown (2) in FIG. 9 and the output at the terminal Q3 of the counter 852 shown (7) in FIG. 9, the NOR gate 853 produces a pulse signal as shown (8) in FIG. 9. Further, relying upon the NOR logic of the output signal of the NOR gate 853 and the output signal of the counter 851 shown (4) in FIG. 9, the NOR gate 854 produces a pulse signal as shown (9) in FIG. 9 which will be supplied to the counter 855.

The counter 855 stops the counting operation at a time $t_1$ at which the timing pulse signal shown (2) in FIG. 9 breaks to the level "0" and the output of the NOR gate 853 shown (8) in FIG. 9 assumes the level "1". Thereafter, outputs of the output terminals Q1 to Q12 of the counter 855 are temporarily stored in the shift registers 856 to 858 (for example, CD 4035 manufactured by RCA) due to the rise of the output Q2 of the counter 852 at a moment $t_2$. When the output Q3 of the counter 852 assumes the level "1" at a moment $t_3$, the counter 855 is reset. When the output Q4 of the counter 852 assumes the level "1" at a moment $t_4$, the counter commences again the counting operation.

Operation of the counter 855 is repeated in synchronism with the production of ignition signals from the ignition coil 12. Therefore, output terminals Q1 to Q4 of each of the shift registers 856 to 858 produce binary signals proportional to inverse number 1/N of engine speed N. A three-state buffer 860 assumes a high input impedance all the time when the signal of the level "1" is applied to a control terminal 861, and output terminals 859 are connected to the microcomputer 100 via bus lines.

The control terminal 861 receives an output signal produced by a NAND gate 862 which receives the I/O signal and SEL signal produced from the device control unit DCU incorporated in the microcomputer 100. When the output signal of the NAND gate 862 assumes the level "0", binary signals proportional to 1/N of outputs of the shift registers 856 to 858 are input to the microcomputer 100.

An intake air amount calculation circuit 90 will be described below with reference to FIG. 10. Clock pulses of an approximately 128 kHz frequency as shown (2) in FIG. 11 are input to an input terminal 911 and are input to a NAND gate 902 and to the clock terminal CL of a divider-equipped counter 901. A pulse of a time Tp proportional to the amount of the intaken air per turn of the engine (hereinafter referred to as Q/N), as shown (1) in FIG. 11, is input to an input terminal 912 from a fuel amount control circuit 120 and is input to the NAND gate 902 and to the reset terminal R of the divider-equipped counter 901. The counter 901 with divider may, for example, be a CD 4017 manufactured by RCA. The divider-equipped counter 901 fundamentally works to count the clock pulse signals C1 input to the clock terminal CL and stops the counting operation when the output signal assumes the level "1" at any one terminal amount the output terminals Q2 to Q6 and when a signal of the level "1" is input to the counting operation stop terminal EN.

Figure 10:
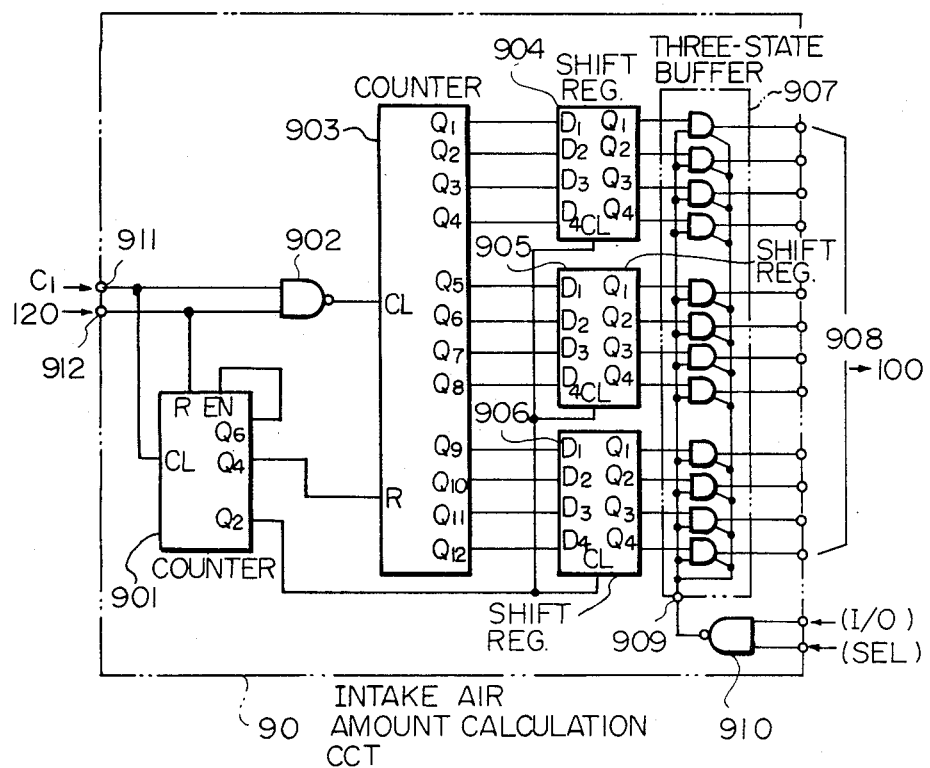
FIG. 10 is a diagram of an intake air amount calculation circuit in the control circuit of FIG. 3.
Figure 11:
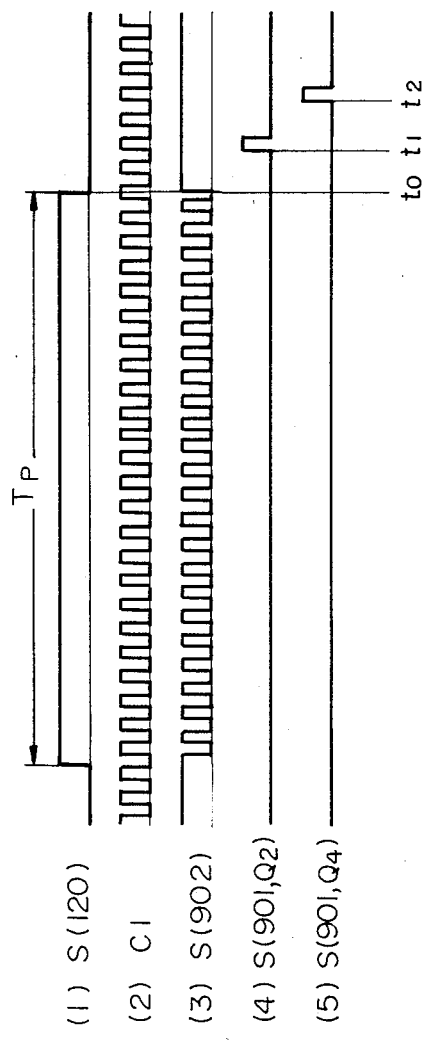
FIG. 11 is a diagram of waveforms for illustrating the operation of the intake air amount calculation circuit of FIG. 10.

In the circuit of FIG. 10, the output terminal Q6 has been connected to the stop terminal EN and when the output of the output terminal Q6 assumes the level "1", a signal of the level "1" is input to the stop terminal EN, so that the counting operation is stopped. When the pulse signal shown (1) in FIG. 11 is input to the reset terminal R from the fuel amount control circuit 120, the counter 901 is reset. When the above input signal assumes the level "0", the counter 901 initiates the counting operation, and pulse signals shown (4) and (5) in FIG. 11 are produced successively from the output terminals Q2 and Q4. Thereafter, when the output of the output terminal Q6 assumes the level "1", the counter 901 again stops the counting operation. Outputs Q2, Q4 of the counter 901 are input to clock terminals CL of the shift registers 904 to 906 (for example, CD 4035 manufactured by RCA) and to the reset terminal R of the counter 903. The output of the NAND gate 902 is input to the clock terminal CL of the counter 903.

Here, when the pulse of the time Tp proportional to Q/N shown (1) in FIG. 11 is input to the input terminal 912, clock pulses C1 are supplied to the counter 903 for the period of time Tp, i.e., the number of clock pulses C1 is counted (in other words, the time Tp is measured). Then, as the pulse assumes the level "0" at time $t_0$, the counter 903 stops the counting operation. As the output Q2 of the counter 901 assumes the level "1" at a time $t_1$, outputs at the output terminals Q1 to Q12 of the counter 903 are temporarily stored in the shift registers 904 to 906. As the output Q4 of the counter 901 assumes the level "1" at a time $t_2$, counter 903 is reset to stand by for the next counting operation. The operation of the counter 903 is repeated in synchronism with the pulse of (1) in FIG. 11. Therefore, output terminals Q1 to Q4 of each of the shift registers 904 to 906 produce binary signals proportional to Q/N in synchronism with the rotation of the engine. A three-state buffer 907 exhibits a high output impedance all the time when the signal of level "1" is applied to a control terminal 909, and output terminals 908 are connected to the microcomputer 100 via bus lines. The control terminal 909 receives an output signal produced by a NAND gate 910 which receives the I/O signal and SEL signal produced by device control unit DCU which is incorporated in the microcomputer 100. When the output signal of the NAND gate 910 assumes the level "0", binary signals proportional to Q/N of the shift registers 904 to 906 are input to the microcomputer 100. The microcomputer 100 may be a widely known 12-bit microcomputer such as TLCS-12A manufactured by Toshiba.

Figure 12:
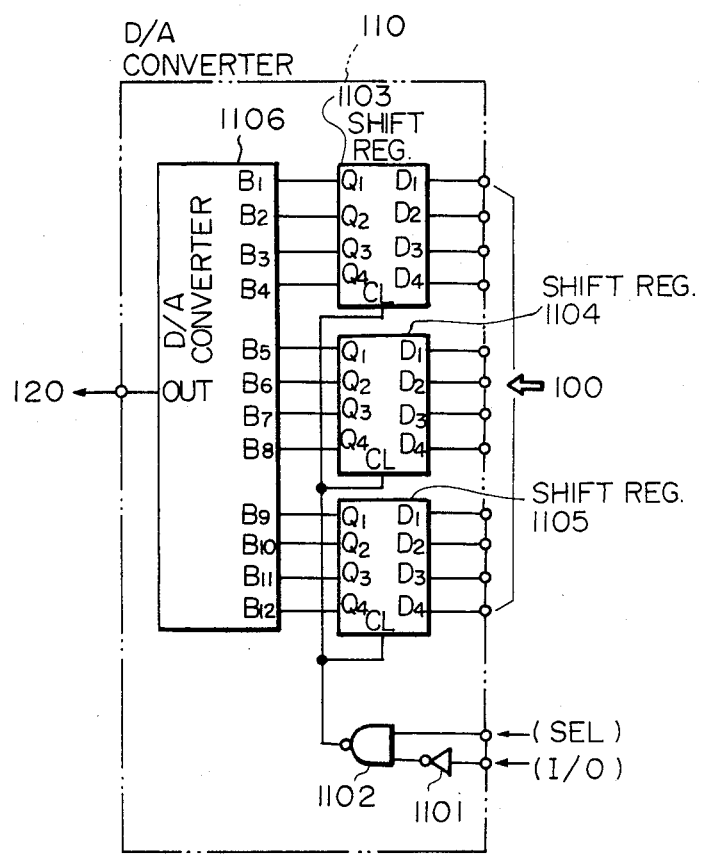
FIG. 12 is a diagram of a digital-analog converter circuit in the control circuit of FIG. 3.

A D-A converter circuit 110 will be described below with reference to FIG. 12. The D-A converter circuit 110 includes an inverter 1101, a NAND gate 1102, shift registers 1103 to 1105, and a D-A converter 1106 (for instance, DAC80 manufactured by Burrbrown). The I/O signal of the microcomputer 100 is inverted by inverter 1101 and is input to NAND gate 1102. The SEL signal is directly input to the NAND gate 1102.

Therefore, when it is so instructed that A/F ratio correction value Fd calculated by the microcomputer 100 be supplied to the D-A conversion circuit 110, the I/O signal assumes the level "0", the SEL signal assumes the level "1", and the NAND gate 1102 produces a signal of the level "0" which will be input to clock terminals CL of the shift registers 1103 to 1105.

The shift registers 1103 to 1105 are the same as those employed for the speed detection circuit 80. That is, when a signal of the level "0" is input to the clock terminal CL, the shift registers introduce the signals which are applied to the data input terminals D1 o D4 and produce the signals from the output terminals Q1 to Q4. Thus, a binary data signal of A/F ratio correction value Fd is input to the input terminals B1 to B12 of the D-A converter 1106, converted into an analog voltage, and produced from the output terminal OUT. That is, the output terminal OUT produces an analog voltage proportional to a data signal representing the A/F ratio correction value Fd.

Described below is an analog fuel amount control circuit 120 which functions equivalent to an electronically controlled fuel injection device (EFI) for four-cylinder engines. Upon receipt of an intake air amount signal from the air-flow meter 3 and an ignition signal from the ignition coil 12 in synchronization with the rotation of the crank of the engine, the fuel amount control circuit 120 generates a pulse signal having a basic width Tp for opening the injector (the aforementioned time proportional to the amount of intake air per turn of the engine Q/N), effects various correction operations depending upon the engine operating conditions to determine the fuel injection time. Here, A/F ratio correction value Fd computed by the microcomputer 100 and converted into an analog voltage by the D-A converter circuit 110 corrects the basic width $T_p$ as same as the intake air temperature, water temperature, and the like.

Figure 13:
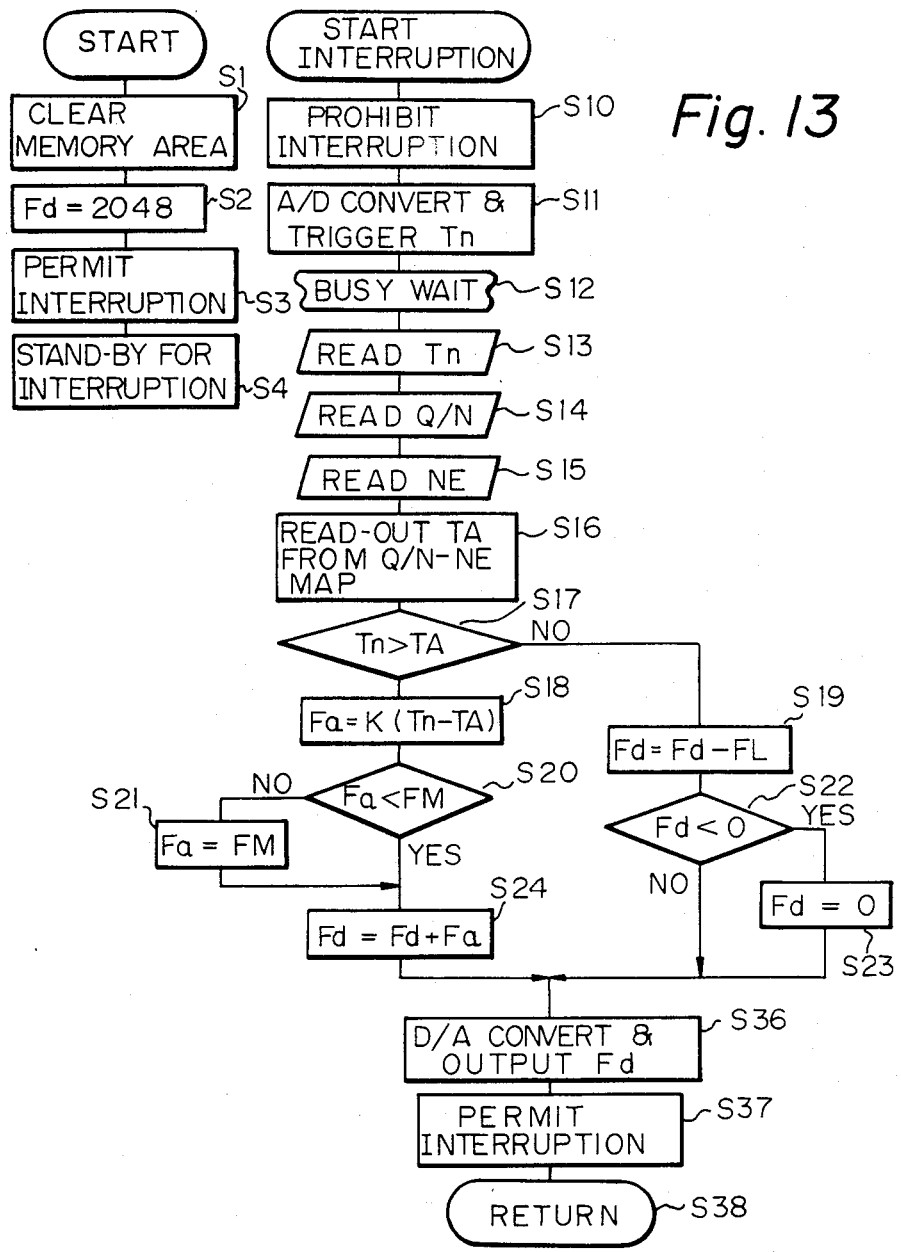
FIG. 13 is a flow chart which illustrates the order of calculations in the control circuit of FIG. 3.

The operation of the microcomputer 100 will be described below with reference to the flow chart of FIG. 13. When the key switch (not shown) is turned on, the power supply turns on to start the operation. The memory is cleared at a step S1, and the initial value of A/F ratio correction value Fd is set to 2048 at a step S2 (i.e., set to an intermediate value of 12 bits: 4096). A master mask is set at a step S3 so that the microcomputer 100 will receive interruption for calculation. Thereafter, the program assumes the stand-by state in a step S4 for interruption for calculation. The state of step S4 is maintained at all times except the case of interruption for executing the calculation.

Figures 14, 15:
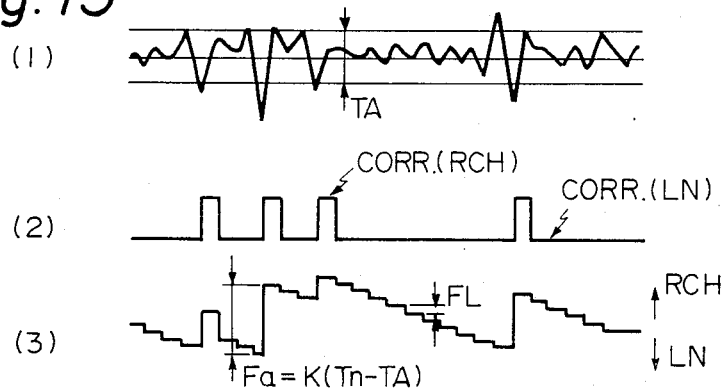
FIG. 14 is a diagram of a map stored in the read-only memory used in the step S16 in the flow chart of FIG. 13.
FIG. 15 is a diagram illustrating the relation between the lapse of time and the A/F ratio correction calculation in the steps S17 to S25 in the flow chart of FIG. 13.

After a given period of time has passed, the timing pulse generator circuit 50 produces a pulse which rises from "0" to "1" as shown (2) in FIG. 6 to initiate the calculation by interruption. When the calculation by interruption is initiated, a step S10 prohibits subsequent interruptions. A pulse of (8) in FIG. 6 is generated at a step S11. Being triggered by this pulse, the A-D converter 701 initiates the A-D conversion and, at the same time, the pulse of (9) in FIG. 6 produced at the terminal EOC assumes the level "1". Therefore, the microcomputer 100 receives a signal of the level "1" through the input terminal BUSY and stops the calculation. This is performed in a step S12. As the A-D converter 701 finishes the A-D conversion, the output of (9) in FIG. 6 produced at the terminal EOC assumes the level "0", and the microcomputer 100 resumes the calculation. When the calculation is resumed, torque variation Tn produced by the A-D converter 701 is read by the microcomputer 100 in a step S13. As mentioned above, the torque variation Tn is subjected to the A-D conversion and is read in the steps S11, S12, and S13. A value Q/N counted by the intake air amount calculation circuit 90 is read in a step S14. A step S15 reads a value 1/NE which is in reverse proportion to the engine speed measured by the speed detection circuit 80 and finds engine speed NE of the relying upon an inverse number thereof. In FIG. 14 is shown a map which illustrates peak values TA in the torque variation when the engine is operated at optimum fuel efficiency points under various conditions with NE and Q/N as parameters of engine operating conditions. The map has been stored beforehand in a ROM.

A step S16 finds where Q/N and NE read out are located in the map of FIG. 14 and reads TA stored in the corresponding ROM address. A step S17 discriminates which is greater between the TA and Tn read at the step S13 and discriminates whether the present A/F ratio at which the engine is operated is on the rich side or on the lean side relative to an optimum fuel efficiency point. That is, when Tn>TA, it is discriminated that the torque varies greatly and the A/F ratio is on the lean side. Therefore, a step S18 corrects the A/F ratio toward the rich side depending upon the intensity of torque variation. Conversely, when Tn<TA, it is discriminated that the torque varies little and the A/F ratio is on the rich side. Therefore, a step S19 corrects the A/F ratio toward the lean side. The step S18 performs the calculation to correct the A/F ratio toward the rich side, i.e., to correct the A/F ratio toward the rich side in proportion to the difference between the present torque variation Tn and a desired torque variation TA. In other words, the greater the torque variation, the greater the amount for correcting the A/F ratio. The smaller the torque variation, the smaller the amount for correcting the A/F ratio. Steps S20, S21 restrict the maximum value for correcting the A/F ratio toward the rich side, so that a restricted value FM for correcting the A/F ratio is sufficient for the engine to be shifted from the unstable combustion region to the stable combustion region. In a step S24, a correction value Fa obtained in the steps S18, S20, and S21 is added to the A/F ratio correction value Fd obtained in the previous calculation, in order to calculate the current A/F ratio correction value Fd. The step S19 performs the calculation to correct the A/F ratio toward the lean side, i.e., substracts a value FL by which the A/F ratio should be corrected toward the lean side from the previous A/F ratio correction value Fd, in order to calculate the current A/F ratio correction value Fd. The value FL for lean correction has been determined taking into consideration the control stability and response characteristics. Steps S22, S23 set the minimum A/F correction value Fd to be 0 so that it will not assume a negative value through the calculation in step S19. A step S36 sends A/F ratio correction value Fd obtained through the above-mentioned calculations to the D-A converter circuit 110, a step S37 permits the interruption, and a step S38 permits the program to return to the initial state where no interruption has been generated.

Owing to the operation described with reference to FIG. 13, the A/F ratio can be controlled to an optimum fuel efficiency point based upon a signal detected by torque detector 13. In FIG. 15 is illustrated the relation between the lapse of time and the calculations for correcting the A/F ratio from the step S17 to the step S36 in the flow chart of FIG. 13. In (1) in FIG. 15 is shown torque variation signals after the filter circuit 30; (2) in FIG. 15 shows the results of torque variation discrimination in the step S17 of FIG. 13; and (3) in FIG. 15 shows the results when the A/F ratio correction value Fd is subjected to the D-A conversion. When the torque variation signals (1) are greater than the peak value TA in torque variation from the standpoint of optimum fuel efficiency point, (2) the torque variation is discriminated to be great, and (3) the A/F ratio correction value Fd is corrected toward the rich side CORR.(RCH). When the torque variation is small, A/F ratio correction value Fd is corrected toward the lean side CORR.(LN).

Figure 1:
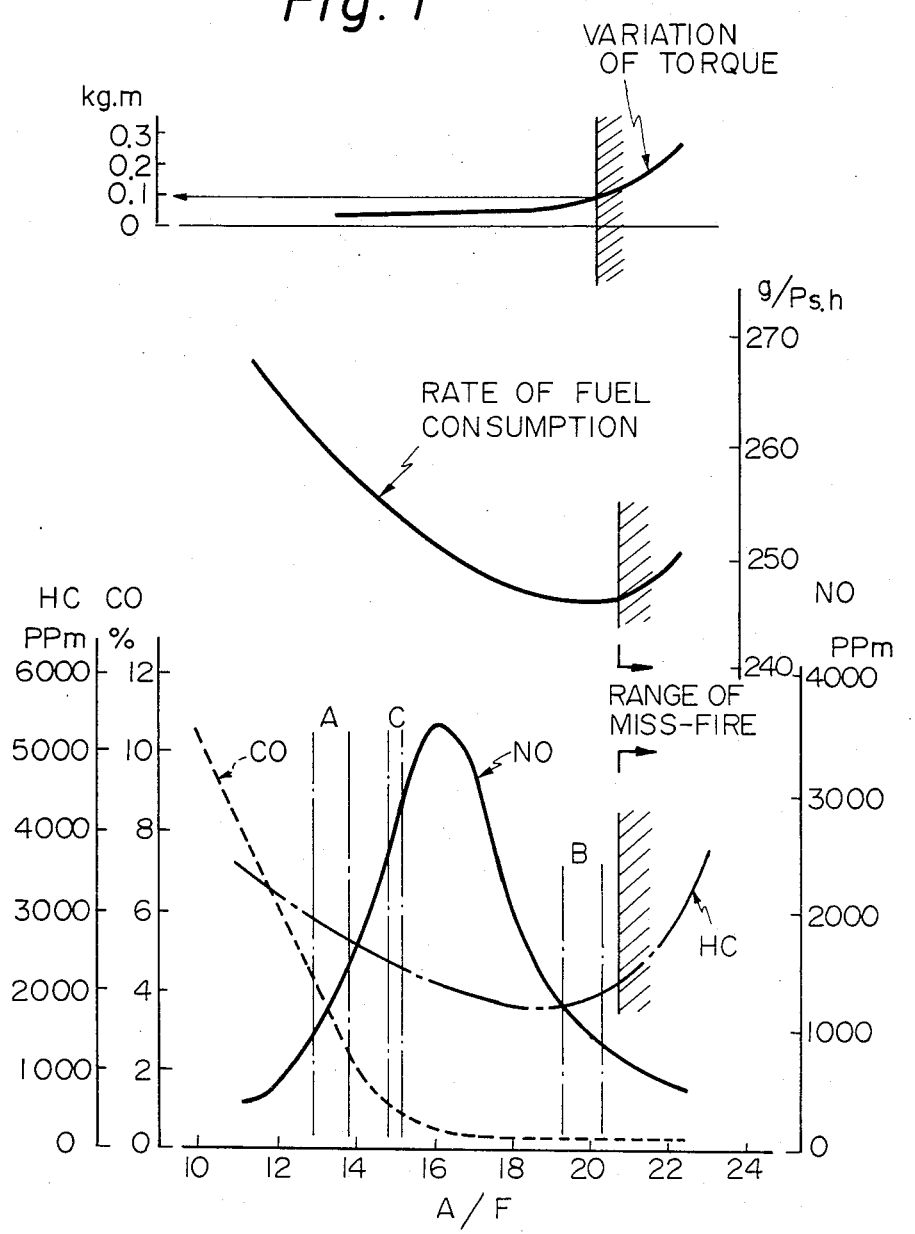
FIG. 1 is a diagram illustrating characteristics of torque variation, fuel consumption rate, and exhaust components with respect to the A/F ratio in an internal combustion engine.

Under the operation conditions of FIG. 1 in which the engine is operated at a speed of 2000 rpm producing a torque of 4 kg-m, the torque variation at an optimum fuel efficiency point according to this embodiment is 0.1 kg-m. Here, the relation between the torque variation and a detection signal obtained from the peak hold circuit is as shown in FIG. 16. Therefore, the discrimination level TA (step S17 in the flow chart of FIG. 13) under the above-mentioned engine operating conditions is set to 1.5 volts, which is equal to the output voltage produced by the peak hold circuit. When the A/F ratio is to be corrected toward the lean side, the correction value FL per each time (0.5 second) is set to 0.015 in terms of the A/F ratio. This value is determined through experiments by taking into consideration the control stability and response characteristics. When the A/F ratio is to be corrected toward the rich side, maximum value FM of correction value Fa per each time (0.5 second) is set to 0.5 in terms of the A/F ratio, so that the A/F ratio can be corrected to an A/F ratio (20.0 in FIG. 1) at an optimum fuel efficiency point in the stable combustion region through one correction, from the A/F ratio (20.5 in FIG. 1) at a boundary between the misfire region and the stable combustion region. A proportional constant K is so determined that the A/F ratio correction value 0.5 is obtained through each operation based upon the difference in torque variation between the A/F ratio 20.5 and the A/F ratio 20.0. When the A/F ratio is to be corrected toward the rich side, it is quickly effected into the stable combustion region through one correction. This is important from the standpoint of preventing engine misfires. Although the above-mentioned embodiment has dealt with an engine equipped with an electronically controlled fuel injection device, the same control can also be effected for an engine equipped with an electronically controlled carburetor.

According to the operation illustrated with reference to FIG. 13, when the torque variation which stems from the variation in combustion of the engine is detected to be smaller than a desired value for controlling torque variation calculated based upon the signals detected by the engine sensor, the A/F ratio is corrected toward the lean side. When the detected signal is greater than said desired value for control the A/F ratio is corrected toward the rich side. Thus, the torque variation of the engine will lie within desired control values under the engine operating conditions. Accordingly, the A/F ratio is always controlled to lie at an optimum fuel efficiency point just before the misfire region under every engine condition and, hence, the engine is allowed to run stably.

Figure 17B:
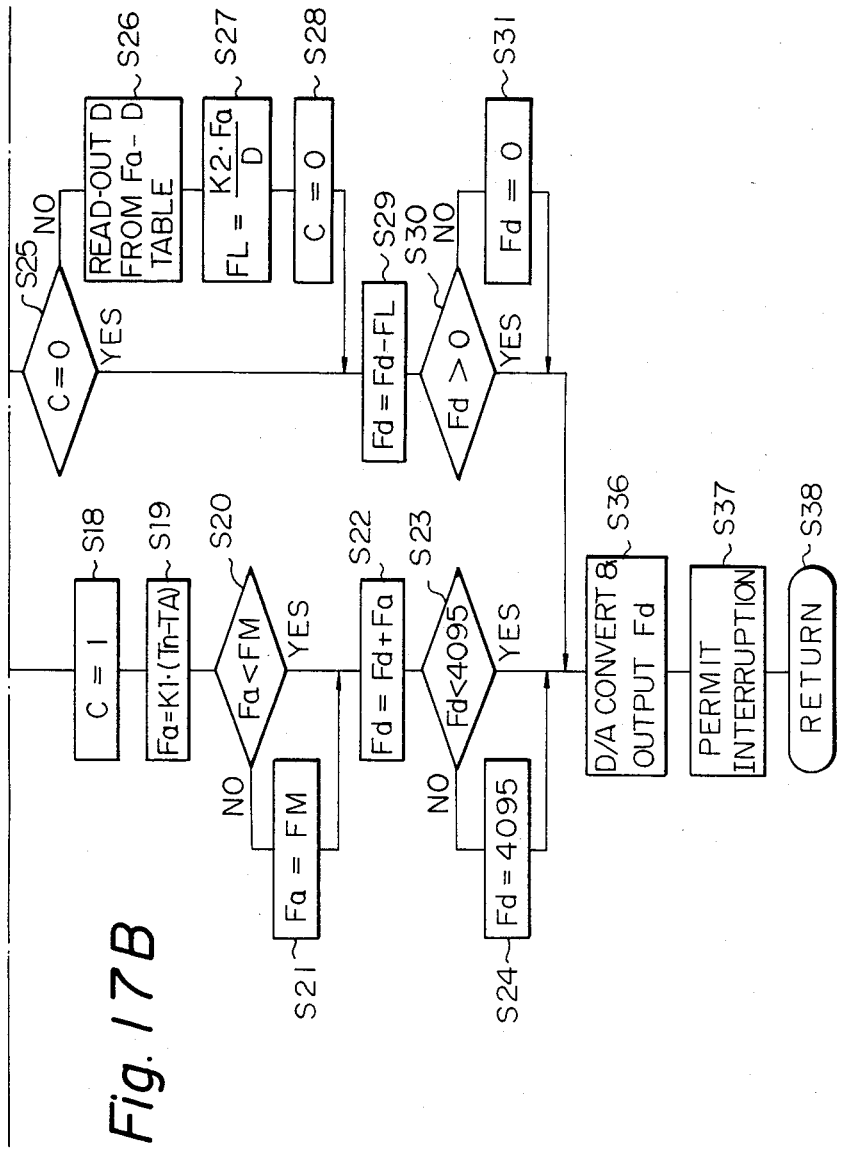

In the flow chart of FIG. 17, a step S18 sets a flag C for discriminating the rich and lean ratio to 1, to store the fact that the A/F ratio was corrected toward the rich side, and a step S19 corrects the A/F ratio toward the rich side in proportion to the difference between the present torque variation Tn and the desired torque variation TA through the calculation of rich correction value Fa. That is, the greater the difference in torque variation, the greater the amount for correcting the A/F ratio. The smaller the difference, the smaller the amount for correcting the A/F ratio. In steps S20, S21, a maximum rich correction value Fa for the A/F ratio is set to FM. The maximum value FM is determined to be a value for correcting the A/F ratio, which is sufficient for shifting the A/F ratio at which the engine lies on a boundary betweeen the unstable combustion region and the stable combustion region to the A/F ratio at which the engine lies in a stable combustion region. A step S22 works to add correction value Fa obtained through the steps S19 to S21 to A/F ratio correction value Fd obtained in the previous calculation, in order to calculate the current A/F ratio correction value Fd. Steps S23, S24 restrict the maximum A/F correction value Fd by a maximum value 4095 consisting of 12 bits. A step S25 checks the flag C to examine whether the calculation by interruption previously performed was the rich correction or the lean correction. When the previous calculation was the rich correction (C=1), steps S26 to S28 calculate a lean correction value FL. The step S26 consults the table of FIG. 19 stored in the ROM for how many times the rich correction value Fa calculated in the previous time should be corrected toward the lean side to obtain a desired value. The step S27 divides the rich correction value Fa by the thus obtained number of times for effecting the lean correction, to calculate a lean correction value FL per each time. A step S28 sets flag C to zero so that the lean correction value FL starts with the same value as the previous time when the next calculation by interruption is to effect the lean correction. A step S29 subtracts the lean correction value FL from the previous A/F ratio correction value Fd, to calculate the current A/F ratio correction value Fd. Steps S30, S31 set a minimum A/F ratio correction value Fd to be 0 so that it will not become a negative value through the calculation in the step S29.

Figure 18B:
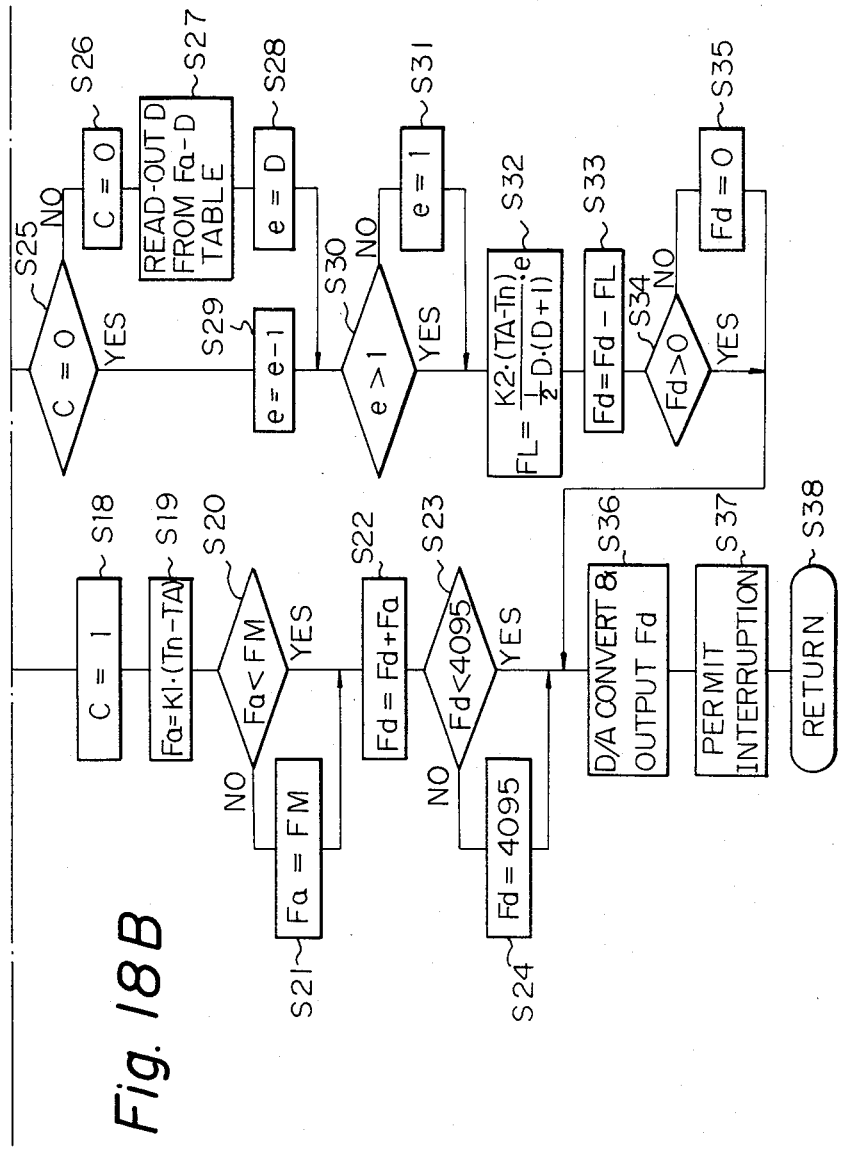

In the flow chart of FIG. 18, a step S25 checks the flag C to examine whether the calculation by interruption effected in the previous time was the rich correction or the lean correction. When the calculation of the previous time was the rich correction (C=1), steps S26 to S28 find a number D for dividing the lean correction. The step S26 sets the flag C to 0 and counts down the counter e for lean correction when the next calculation by interruption is to effect the lean correction. The step S27 reads the table of FIG. 19 stored in the ROM in response to rich correction value Fa previously calculated, to find a number D for dividing the lean correction to obtain a desired value. The step S28 sets the number D to the counter e. A step S29 counts down the counter e for lean correction by one when the calculation for lean correction is to be effected following the previous calculation for lean correction. Steps S30, S31 set the minimum value of counter e to 1, so that the lean correction value FL calculated in a step S32 will not become 0. The step S32 calculates the lean correction value FL and divides the difference of A/F ratio from a desired value into D arithmetical progressions obtained in the step S27, so that the correction value changes from a large value to a fine value as it approaches the desired value, relying upon the counter e. A step S33 substracts the lean correction value FL from the previous A/F ratio correction value Fd to calculate the current A/F ratio correction value Fd. Steps S34, S35 set the minimum A/F ratio correction value Fd to 0 so that it will not become a negative value through the calculation.

We claim:

1. An air-fuel ratio control device for an engine having an engine mount, comprising
   torque detection means for outputting detection signals from a pressure sensor axially mounted on the end of an engine arm the other end of which is connected to said engine, said pressure sensor being compressed between a rubber mount cover covering a rubber mount mounted on said engine mount and a flange on said engine arm;

fuel-injector means for selectively injecting fuel into said engine; and control means for controlling at least the fuel injector means to control the air-fuel ratio of said engine in accordance with said detection signals, said control means including means for producing a fuel injector control signal by processing said detection signals through a bandpass filter of 1 to several Hz frequency band, comparing said filtered detection signals with a desired air-fuel ratio control value and outputting a command signal to said fuel injector based on said comparison.

2. An air-fuel ratio control device for an engine having an engine mount, comprising torque detection means for outputting detection signals from a pressure sensor axially mounted on the end of an engine arm the other end of which is connected to said engine, said pressure sensor being compressed between a rubber mount cover covering a rubber mount mounted on said engine mount and a flange on said engine arm.

ignition coil means for outputting synchronizing signals from which the rotational speed of said engine may be derived;

fuel injector means for selectively injecting fuel into said engine; and control means for controlling at least the fuel injector means to control the air-fuel ratio of said engine in accordance with said detection signals and said synchronizing signals, said control means including means for producing a fuel injector control signal by processing said detection signals through a bandpass filter of 1 to several Hz frequency band, comparing said filtered detection signals with a desired air-fuel ratio control value and outputting a command signal to said fuel injector based on said comparison in synchronization with said synchronizing signals.

3. A device as set forth in claim 2, wherein said control means includes means for detecting a peak value in the outputs from said filter within a predetermined period of time.

4. A device as set forth in claim 2, wherein said control means comprises:

a clock circuit;

a timing pulse generator circuit which receives output signals produced by said clock circuit;

a peak hold circuit for receiving output signals produced by said timing pulse generator circuit and a filter circuit;

an analog-to-digital converter circuit for receiving output signals produced by said peak hold circuit;

a microcomputer for calculating a value for correcting air-fuel ratio upon transmission and reception of signals relative to said analog-to-digital converter circuit, a circuit for detecting the engine speed, and a circuit for metering the amount of the intake air;

a digital-to-analog converter circuit for receiving output signals from said microcomputer; and a fuel amount control circuit which generates a fuel control signal upon receipt of output signals from said digital-to-analog converter circuit, said ignition coil, and said air-flow meter.

5. A device as set forth in claim 2, wherein said control means includes means for correcting, when the output value from said filter circuit is greater than said desired value, the air-fuel ratio to become rich and the correction quantity per one time is changed depending upon the difference between the output value and the desired value, and for correcting, when said output value is smaller than said desired value, the air-fuel ratio to become lean, and the correction quantity per one time is so divided that the air-fuel ratio gains said desired value through the correction of at least two times.

6. A device as set forth in claim 5, wherein said control means includes means for dividing, when said output value is smaller than said desired value, the correction quantity so that the desired value is attained through the correction of at least two or more times, the correction quantity of each time being the same.

7. A device as set forth in claim 5, wherein said control means includes means for dividing, when said output value is smaller that said desired value, the correction quantity so that the desired value is obtained through the correction of at least two or more times, the correction quantity of each time being changed in response to the difference between said output value and said desired value.

* * * * *